Oct. 14, 1952     E. A. MALLETT ET AL     2,614,146
SEAM WELDER HEAD
Filed Sept. 19, 1951
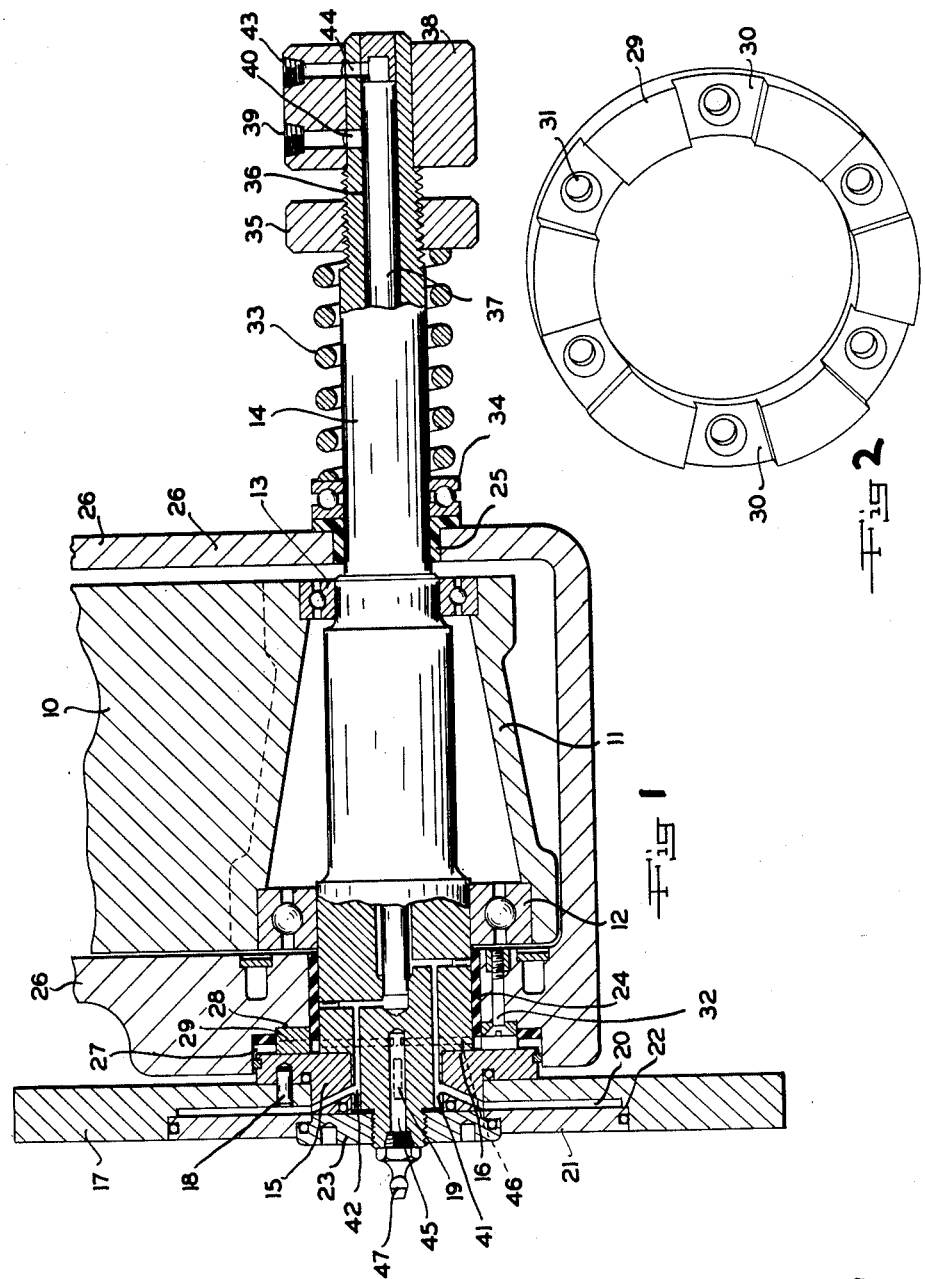
Inventors
EDWIN A. MALLETT
MELVIN M. SEELOFF
By Francis J. Klempay
Attorney Patented Oct. 14, 1952

2,614,146

UNITED STATES PATENT OFFICE 2,614,146

SEAM WELDER HEAD

Edwin A. Mallett and Melvin M. Seeloff, Warren, Ohio, assignors to The Taylor-Winfield Corporation, Warren, Ohio, a corporation of Ohio Application September 19, 1951, Serial No. 247,262

5 Claims. (Cl. 173—324)

This invention relates to electric resistance welding apparatus and more particularly to an improved construction for rotatably supporting a rotary wheel-type of electrode as used in electric resistance seam welding and for conducting welding current thereto from a stationary part of the welding current source such as the secondary of a resistance welding transformer. Such electrodes must be mounted with sufficient rigidity to withstand the welding pressures required to be applied to the work and should, of course, have reasonable friction losses so as not to seriously impede the progression of the work between the electrodes. Further, the design of the journals for the rotary electrodes should allow for maximum throat clearance in the welding machine but of equal or greater importance is the requirement that the electrical connection between the fixed part of the welding current source and the rotary electrode have a minimum of resistance so as to avoid excessive losses and severe heating in this assembly. The combination of these general requirements, together with the necessity of providing practical apparatus which is not unreasonable in cost and which may be readily serviced in the field, has for some time caused the greatest design problem in electric resistance seam welding machinery. In most practical apparatus the requirements are attempted to be met by employing a metallic bushing for the spindle of the rotary electrode with both the spindle and the bushing being made of soft metal having high current conductive characteristics. Since effective lubrication can not be used in this assembly due to electrical requirements the wear of the parts is extremely rapid particularly when heavy welding pressures are employed and consequently less expensive maintenance is required and it is impossible to maintain any accurate alignment of the mechanism over long periods of service.

The present invention seeks to provide an entirely practical assembly for meeting the above requirements whereby the rigidity and alignment of the rotary electrode is permanent and the electrode is capable of transmitting heavy welding pressures and currents, whereby electrical losses and heating are minimized while an effective and consistent control over the electrode friction may be maintained and balanced against the current-carrying requirements, whereby there is minimum interference with the throat passage through the machine and with ease of interchanging electrodes or current-collecting rings used, and whereby the assembly may be produced and assembled at reasonable cost.

A further object of the invention is the provision of apparatus for the purpose indicated above and having the general characteristics outlined of an improved arrangement for dispersing the conduction of the welding current over wide areas of rubbing contact between a fixed and movable part of the assembly to thereby reduce losses and heating by reduction of current densities, and of an improved arrangement for minimizing the length of the conductive path transmitting the welding current to the welding wheel proper to thereby further reduce electrical losses while improving the power factor of the welding circuit.

The above and other objects and advantages of our invention will become apparent upon consideration of the following detailed specification and the accompanying drawing wherein we have disclosed a preferred embodiment of the invention.

In the drawing:

Figure 1 is an axial section through a seam welder head constructed in accordance with the principles of our invention; and Figure 2 is a perspective view of a current collecting ring utilized in the assembly of Figure 1.

In the drawing, reference numeral 10 designates a stiff structural member which is part of the mechanical assembly of a complete welding machine, not shown, and it should be observed that this member may be either rigidly fixed on the machine frame or accurately guided thereon for rectilinear movement to open and close onto the work to be welded. The member 10 is a projecting member and at its free end it is formed with a tapered bore 11 having bearing-retaining recesses at each end thereof. Extending through said bore and rotatably supported therein on the anti-friction bearings 12 and 13 is a spindle 14 which may be made of steel to thereby provide a strong rotary support for the rotary electrode. For mounting the ladder on the spindle we provide an adapter 15 which is made of copper alloy or other metal of high electrical conductivity and, as shown, this adapter rests against a shoulder 16 formed adjacent the outer end of the spindle 14. The adapter 15 is flanged, as shown, and slidably received against the outer face of this flange is the wheel electrode 17, a plurality of circumferentially spaced dowels, only one of which is shown at 18, are employed to key the electrode 17 to the adapter 15 and a suitable Woodruff type of key 19 is employed to key the adapter 15 onto the spindle 14 whereby these parts will also rotate together.

Electrode 17 is recessed in its center portion as shown at 20 to provide space for the passage of a coolant and closing off this recess is an annular cover plate 21 the outer edge of which bears against a shoulder 22 formed in the peripheral edge of the recess 20. The outer extremity of the spindle 14 is reduced in diameter and threaded to receive a nut 23 which has stepped bearing contact with the cover plate 21 to maintain the latter in proper concentric relation with respect to the axis of spindle 14 and tightly engaged against the shoulder 22. The various parts are so dimensioned that the nut 23 also engages the outer face of the adapter 15 to clamp the same tightly against the shoulder 16 of the spindle 14 and it will be understood that the inherent flexibility of the cover plate 21 will allow this to be accomplished while at the same time allowing the cover plate 21 to be held tightly against the shoulder 22.

Encased about the free end portion of the structural member 10 and floatingly mounted on the spindle 14 by means of insulating bushings 24 and 25 is a hollow current conductive member 26 which in actual practice will be connected to a fixed part of the welding current supply circuit, such as a terminal pad of a welding transformer secondary, by a flexible leaf-type of connector, not shown. Member 26 will be formed of copper alloy or other metal having good electrical conductivity and it should be noted that the wall of this member which is intermediate the wheel electrode 17 and the support member 10 is greatly thickened in the region of the spindle 14. This thickened wall portion is counterbored inwardly from its outer face as shown at 27 and the bottom wall of this counterbore is formed with an annular recess 28 to receive a collector ring 29. The latter is shown in detail in Figure 2 and comprises a thick annular ring preferably made of a silver alloy to provide good wearing characteristics and superior electrical conductivity. Ring 29 is formed on its outer face with a plurality of circumferentially spaced recesses 30 which are drilled and counterbored as shown at 31 to receive the heads of screws 32 (Figure 1) whereby the collector ring 29 may be rigidly secured to the conductor 26. As thus constructed, the heads of the mounting screws 32 are recessed and there is provided on the outer face of the ring a plurality of circumferentially spaced lands which are adapted to be brought into pressure contact with the flat and polished inner face of the adapter ring 15. To provide this pressure and to automatically compensate for wear on the lands of the ring 29 or on the contacting face of the ring 15 we provide an expansion type of coil spring 33 which encircles a portion of the outward projection of the spindle 14 and is positioned between a thrust bearing 34 which bears against the adjacent wall of conductor 26 and an adjusting nut 35 which is screw threadedly mounted on the spindle 14. It should be understood that the conductor 26 is free to slide longitudinally on the spindle 14 while the spindle is effectively restrained against longitudinal movement to the right (as view in Figure 1) with respect to the supporting member 10 by reason of bearing fits. Therefore the spring 33 maintains a predetermined bearing pressure between the rings 29 and 15 and this pressure is consistently maintained even upon wear of the parts due to the substantial axial length of spring 33. Further, since the spindle is held against axial movement with respect to the principal structural assembly of the machine and since the welding electrode 17 is rigidly mounted on the spindle the position and alignment of the electrode will remain fixed regardless of the extent of wear between the rings 15 and 29. Due to the relatively wide axial space of the bearings 12 and 13 and the yet wider spacing of the sleeves 24 and 25 the interengaging faces of the rings 15 and 29 will be held in accurate parallelism, thereby insuring good contact throughout the whole of the circumferential extent of these rings. This characteristic, coupled with the relatively large effective cross sectional area provided in the current conductive wall of the connector 26 insures a wide distribution of the current flow with the consequent reduction in the $I^2R$ loss. Nevertheless, the provision of the separate lands on the ring 29 increases the unit pressure which is applied between the ring 29 and the adapter 15 to thereby insure good electrical conductivity across the sliding joint even though a lubricant is used to reduce friction and wear in the parts. It should also be observed that the path of current flow from the thickened portion of the wall of conductor 26 into the welding wheel proper is very short so that the inductive reactance in the welding circuit is at a minimum to improve the power factor while again the resistive losses are materially reduced.

Spindle 14 is bored longitudinally at 36 to receive a tube 37 of lesser diameter, the inner end portion of which is tightly recived in the inner extremity of the bore which likewise is of smaller diameter. Rotatable on the projecting end of spindle 14 is a fitting 38 having a port 39 leading to the annular space between the bore 36 and tube 37 by means of a plurality of radially spaced apertures formed in the side wall of spindle 14, one of which is shown at 40. The electrode end portion of the spindle 14 and the adapter 15 are suitably drilled to provide a passageway 41 for cooling fluid from the annular space surrounding tube 37 to a segmental portion of the space 20 in the welding wheel enclosed by the cover 21. The spindle and adapter are further suitably drilled to provide a passageway 42 from a diametrically opposite segmental portion of the space 20 into the tube 37 which space within said tube is open to import 43 in fitting 38 through a further set of circumferentially spaced apertures formed in the side wall of spindle 14 and one of which is shown at 44. It should therefore be understood that the welding electrode 17 may be effectively cooled by the flow of cooling fluid in the space 20 circumferentially about the cylindrical outline of the body portion of the adapter 15. This insures circumferential uniformity in the cooling of electrodes 17 and since the path of flow of the cooling fluid is quite close to the sliding connection between rings 15 and 29 and is in very effective heat exchanging relation thereto the entire assembly may be efficiently cooled for best operational results.

To provide for the lubrication of the joint between the rings 15 and 29 a bore 45 is formed in the end of spindle 15 and these connect with radial holes 46 which are drilled in the body of the spindle to lead into the recesses 30 of the ring 29. These recesses form, in effect, storage reservoirs for lubricant which in the first instance may be charged through a fitting 47 secured in the outer end of bore 45.

It should now be apparent that we have provided an improved seam welding head which accomplishes the objects initially set out, particularly those relating to permanency of alignment, durability, low friction and electrical losses, and minimum space utilization in the welding throat of the machine. Another advantage of the structure of our invention which is of special importance is the ease with which the various parts thereof may be produced and either assembled in the manufacture of the head or replaced during maintenance operations. For example, both the electrode 17 and the adapter 15 are removable upon taking off nut 23 to thereby expose the interengaging faces of the adapter and of the ring 29 for inspection and cleaning and/or polishing and, of course, the ring 29 may itself then be quickly removed by backing out the screws 32 which are then readily accessible. It is possible to quickly replace the parts of this circuit connection with each change of electrodes and through the use of spare parts reconditioned adapters 15 and rings 29 may be kept on hand at all times. The invention thus solves one of the major maintenance problems heretofore encountered in the operation of electric resistance seam welding apparatus.

Since some changes may be made in the embodiment of the invention herein specifically illustrated and described without departing from the spirit or scope of the invention, reference should be had to the appended claims in determining the scope of the invention.

We claim:

1. In apparatus for rotatably supporting and conducting welding current to a rotary electrode of an electric resistance welding machine and having a projecting rigid support with a spindle journaled therein and extending outwardly of opposite sides thereof, the improvement which comprises a hollow conductor encasing the free end portion of said support and having aligned bores in opposite walls thereof for the reception of portions of said spindle whereby said conductor is floatingly mounted on said spindle for axial movement thereon, means for securing a rotary electrode to one end of said spindle comprising a current-conductive adapter ring mounted on the end portion of said spindle and having a flat inner face, a current-conductive ring rigidly mounted on the outer face of an adjacent wall of said conductor and adapted to be brought into pressure contact with said adapter upon movement of said conductor axially along said spindle, and spring means interposed between the opposite wall of said conductor and the opposite end portion of said spindle to urge said conductor axially along said spindle to thereby yieldingly maintain a predetermined pressure engagement between said adapter and said ring.

2. Apparatus according to claim 1 further characterized in that said current-conductive ring is formed with a plurality of circumferentially spaced but radially extending recesses in its face which bears against said adapter, and means positioned in said recesses to rigidly mount said current-conductive ring onto the wall of said conductor.

3. Apparatus according to claim 2 further including radial and axial passages in said spindle terminating at the adjacent end extremity of the spindle and opening into said recesses whereby lubricant may be supplied to said recesses from the extreme end of said spindle.

4. In apparatus for rotatably supporting and conducting welding current to a rotary electrode of an electric resistance seam welder and having a projecting rigid support with a spindle journaled therein and restrained against axial movement, the improvement which comprises forming said spindle with an enlarged end portion extending outwardly of one side of said support, said spindle having cylindrical outer faces on said enlarged end portion and on the portion thereof which extends outwardly of the other side of said support, insulating bearing sleeves mounted on said cylindrical surfaces and adapted to move axially thereon while the spindle rotates therein, a hollow conductor encasing the projecting free end of said support and having aligned bores in its opposite side walls to tightly receive said sleeves whereby said conductor is mounted on said spindle for axial movement thereon, the end portion of said spindle outwardly of one of said sleeves being reduced in diameter and shouldered to receive an annular adapter for the mounting of the rotary electrode, screw threaded means on the end extremity of said spindle to releasably lock said adapter against said shoulder, said adapter having a flat inner face radially outward of said shoulder, the side wall of said conductor being of thick section in the region of said adapter, a current-conductive ring rigidly secured to said thick-section wall of said conductor and adapted to have pressure contact with said flat face of said adapter, and resilient means mounted on said spindle and interposed between the opposite side wall of said conductor and the opposite end of the spindle to resiliently urge said conductor axially along said spindle in the direction of said electrode to maintain contact pressure between said conductive ring and said adapter.

5. Apparatus according to claim 4 further characterized in that the outer face of said thick-section wall of said conductor is formed with a stepped annular recess, said current-conductive ring being received in the smaller-diametered portion of said annular recess, the outer peripheral surface of said adapter being cylindrical and received within the larger-diametered portion of said annular recess, means comprising axial and radial passages in said spindle to supply lubricant to said current-conductive ring, and an annular sealing ring interposed between the outer peripheral surface of said adapter and the larger diameter of said annular recess to retain said lubricant.

EDWIN A. MALLETT.
MELVIN M. SEELOFF.

No references cited.